(12) United States Patent
McAfee, II et al.

(10) Patent No.: US 7,474,769 B1
(45) Date of Patent: Jan. 6, 2009

(54) BIOINDEX MECHANISM FOR INCREASING THE RELATIVE SPEED OF BIOMETRIC IDENTIFICATION AGAINST LARGE POPULATION SAMPLES

(75) Inventors: Kenneth N. McAfee, II, St. Louis, MO (US); Randall C. Stone, Shiloh, IL (US)

(73) Assignee: Unisys Corporation, Blue Bell, PA (US)

( * ) Notice: Subject to any disclaimer, the term of this patent is extended or adjusted under 35 U.S.C. 154(b) by 843 days.

(21) Appl. No.: 10/941,581

(22) Filed: Sep. 14, 2004

(51) Int. Cl.
*G06K 9/00* (2006.01)

(52) U.S. Cl. .................. 382/115; 382/190; 380/277; 726/19; 348/E7.056

(58) Field of Classification Search ............... 382/115, 382/124, 190, 276; 713/186, 156, 182, 185, 713/176, 155, 170, 168, 175, 166, 184, 183; 380/231, 277; 726/10, 5, 9, 19; 348/E7.056, 348/E7.071; 235/380; 705/67, 51; 340/5.53
See application file for complete search history.

(56) References Cited

U.S. PATENT DOCUMENTS

| | | | | |
|---|---|---|---|---|
| 6,035,398 | A * | 3/2000 | Bjorn | 713/186 |
| 6,041,133 | A * | 3/2000 | Califano et al. | 382/124 |
| 6,185,316 | B1 * | 2/2001 | Buffam | 382/115 |
| 6,484,260 | B1 * | 11/2002 | Scott et al. | 713/186 |
| 6,507,912 | B1 * | 1/2003 | Matyas et al. | 713/186 |
| 6,990,684 | B2 * | 1/2006 | Futamura et al. | 726/18 |
| 2002/0026582 | A1 * | 2/2002 | Futamura et al. | 713/170 |

* cited by examiner

*Primary Examiner*—Sheela C Chawan
(74) *Attorney, Agent, or Firm*—James E. Goepel; Robert P. Marley

(57) ABSTRACT

A method and system for determining a smaller sample of large data objects to search through for a match to one under test. The data objects are in preferred embodiments biometric templates.

24 Claims, 4 Drawing Sheets

Enrollment BioIndex
Template Key Generation

Identification Process

BIOINDEX MECHANISM FOR INCREASING THE RELATIVE SPEED OF BIOMETRIC IDENTIFICATION AGAINST LARGE POPULATION SAMPLES

BACKGROUND OF THE INVENTION

1. Field of the Invention

This invention relates to the field of data processing generally, particularly to performing fast searches in data having many large data objects to find matches to an unknown similar large data object. It has particular application to authentication utilizing biometric data and more specifically the method and process of biometric database searching.

2. Background

A significant problem facing biometric identification using a large population is the processing time required to perform a full comparison on the entire population to a presenting person, so as to identify that person. Even when the database processing is optimized and the data is available before the comparison, the biometric comparison operation becomes a timing bottleneck that slows the identification process on large populations to such a degree as to make real time use of such searches unavailable. One way to decrease the time required for biometric identification of an individual is to decrease the population against which a comparison must be performed. One potential solution is to use a mechanism to narrow the potential match population must be used to restrict the set of biometric templates from the overall population of templates needing to be compared to the collected biometric data, or rather, the collected biometric data in a templatized form.

Currently, there are a few mechanisms proposed to do this. One method of reducing the population of templates used for fingerprint comparison is based on comparing 5 predetermined characteristic data points of a fingerprint. Using a comparison of these 5 data points in the collected biometric and comparing it to the same five data points in the potential population of templates reduces the amount of digit-wise compares that have to be accomplished. Only on the population sample's templates that match on the 5 data points of the captured biometric can be relevant, so only on those that match is a full biometric comparison performed.

This method has several disadvantages. First, the solution has only been demonstrated for fingerprint identification data sets and may therefore not be transferable to other methods of biometric identification including facial and iris pattern recognition data sets. Second, the solution has been fixed to a specific database, e.g. Oracle RDBMS, to provide fast database indexing with multiple keys for searching. Third, the accuracy of the method is affected as the biometric data retrieved changes. Biometric data collected from a given individual can change over time for many reasons including age, trauma, and so on.

We have discovered that by using an algorithm to generate a small, derivative key from a template, a database would be able to create an index capable of identifying one or more candidate records to examine in detail. Rather than comparing the unknown biometric to, say, 100,000,000 records, a system would then be able to identify perhaps 10,000 possible matches for detailed examination, cutting processing time from hours to less than a second.

A real world example for how this could be applied would be the US VISIT program which calls for passing a person through a lane (as in an immigration lane) in a matter of a few seconds or less while comparing that person to a watch list of dangerous or undesirable people. Current state of the art will not allow this watch list to exceed 12,000 people (using fingerprint data for example), as current technology limits biometric searches to about 20,000 records per second (20,000×6 seconds=120,000 records; 120,000÷10 fingers=12,000 people).

SUMMARY OF THE INVENTION

It is an object of this invention to overcome the disadvantages of prior methods by defining an implementation-independent mathematically calculated index which will be used to reliably reduce the population of templates in the overall population of templates that may be required for a full biometric comparison. It is a further object of this invention is to provide a flexible method in which various biometric types, devices, algorithms and storage mechanisms may be used in the solution. It is also a further object of the invention is to present the data in a standard form which may enable different biometric templates to be stored in a common location, i.e. enterprise biometrics storage. It should also be noted that the techniques described herein can be applied to any large data object database and search for matches therein to a particular large data object under consideration.

The preferred embodiment uses three steps, Template Key $(x_t)$ generation upon enrollment, Dynamic Key $(x_d)$ generation accompanied by a range of error (y) during a subsequent authentication process, and third, the search of the Template Key $(x_t)$ database using the Dynamic Key $(x_d)$ to authenticate. After this third step, any templates matching the template key can be compared to the collected biometric or its template to obtain a particular match.

In the first step of the preferred embodiment, a Template Key $(x_t)$ is generated and stored for each biometric template in the Biometric Database. The Biometric Database contains the user identification and the corresponding biometric data as a Biometric Template generated during enrollment. The Biometric Template consists of a string of binary data points of unspecified length generated by the implemented biometric device upon biometric feature detection. The Template Key $(x_t)$ will be generated each time a template is generated, e.g. during initial enrollment, successive enrollment or ongoing training. In one example of the preferred embodiment, the Template Key $(x_t)$ may be generated using a fingerprint biometric detector. The biometric detector detects any number of data points on the fingerprint and creates a biometric template using binary numbers that represent the value of those data points. A Template Key $(x_t)$ will then be generated from that template, with the most significant attribute as the first digit, the second most significant attribute as the second digit, and so forth until a number is formed corresponding to the number of attributes desired. In describing the preferred embodiments, the words attribute and digit should be considered interchangeable. (A key could use multiple digits or bits if desired, but the larger the key, generally the longer the search times will be). In one example of the preferred embodiment, a number such as 876,543,210 will be generated representing the Template Key $(x_t)$, where the number "8" represents the most significant attribute of the biometric template, e.g. height of fingerprint whorl, and the number "7" represents the next most significant attribute of the biometric template, e.g. height of the fingerprint curve and so forth. The Template Key $(x_t)$ becomes a comparison key, and in an example of the preferred embodiment, consists of an 8 digit integer representation of the template. The 8 digit integer represents the significant attributes of the biometric data from the most significant to the least significant. Two examples of significant attributes may include distance between the eyes and fingerprint swirl height, for face recognition and fingerprint biometrics, respectively. These attributes will be defined according to the biometric sensor utilized. The Template Key ($x_t$) is then stored in a database.

In the third step of the preferred embodiment, a Dynamic Key ($x_d$) is generated during the identification process using the same process as the Template Key ($x_t$) generation on either the same biometric machine or another biometric machine. Depending on the biometric collection device, certain portions of the least significant attributes may either be dropped or not generated at all. Also, depending on the biometric collection device, a collection range error is included with the template, increasing the range of keys searched by the amount of the error.

In the third step of the preferred embodiment, matching of the Template Key ($x_t$) to the Dynamic Key authenticates the user. In the preferred embodiment, the Template Key ($x_t$) database field is reduced by matching the most significant digit of the Dynamic Key to the most significant digit of the Template Keys ($x_t$). The Template Key ($x_t$) search field then contains only those numbers whose most significant digits match the most significant digit of the Dynamic Key. A further narrowing search is performed by matching the next most significant digit of the Dynamic Key with the next most significant digit of the Template Key ($x_t$) in the previously reduced Template Key database field. Subsequent to the search, the Template Key search field contains only those numbers whose most significant and second most significant digits match the most significant and second most significant digits of the Template Key. We could use a range of match, such that for example a 6 could be considered within range of a 4 if the range is exact number plus 2 and minus 1, for example. This would be valuable where there is great variation in a particular significant digit/attribute known for a given biometric. There can be substantial variation from one biometric to another and even within particular biometric reader data template populations and these variables need to be controlled. The invention will work best within a single biometric and single type of reader/template generator combination. It is advised that the key attributes be selected based on known characteristics of the biometric and reader/template generator combination. Note that after the Template keys that fall within range or match the Dynamic Key are found, all those templates in the overall population database can be searched to determine matches to the collected biometric data's template, thus reducing significantly the overall search time needed to locate an exact match.

DETAILED DESCRIPTION OF THE PREFERRED EMBODIMENTS

Figure 1:
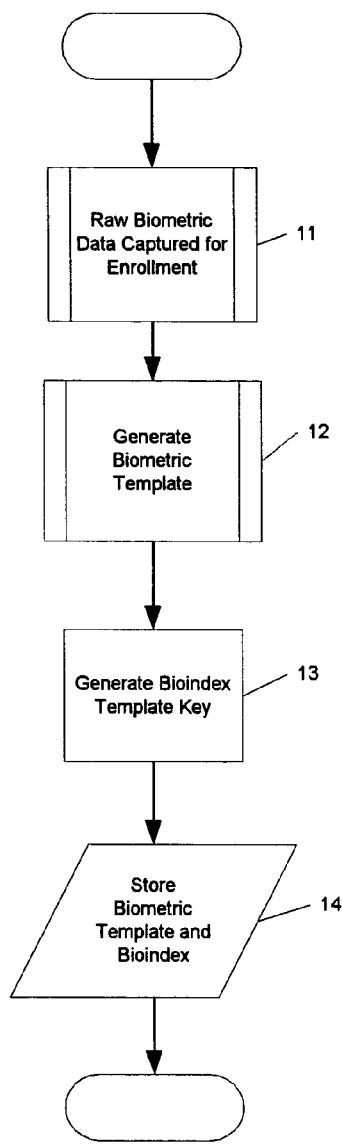
FIGS. 1 and 2 are flow charts for illustrating example processes that can be used by preferred embodiments of this invention.

The solution proposed here is to generate a single long number from the biometric template itself. This number preferably may be represented as an eight-byte integer and stored in any kind of database. This number can then be used as a key in the database just as any other number to speed searches and selectively extract the data from the database. This key would not necessarily be a unique key, but the more near unique the generated key is, the faster the identification process can be.

We begin with raw biometric data capture at an 'enrollment' facility or station in an initial phase 11 of generating a bioindex template key. An enrollment station can be one that has a mechanism for sensing or registering a measurement or set of measurements that identify an individual human being. For example, facial recognition systems could be used. Such systems analyze the characteristics of a person's face images input through a digital video camera, by measuring overall facial structure, such as distances between eyes, nose, mouth, and jaw edges. These measurements are retained in a database and used as a comparison when a user stands before the camera. But the size of the data file for each individual is large. Iris scans can also be used, and with the relatively small files required by the technology developed by professor John Daugman of Cambridge and a company called Iridian, it may be easier to check for a match with a present person's iris scan against one recorded in an enrollment than it would be for a facial pattern. Fingerprints too, offer fairly small sized files of data for a good biometric match. Any biometric, or combination of biometrics, could be used by this invention, but we show our first example using fingerprint data. In all events, the enrollment station will be used to capture a biometric for an individual.

However, it should be recognized that enrollment stations are not necessary in security situations where one needs to surreptitiously obtain a biometric of a criminal or other security risk subject, and in such situations hidden sensors or public cameras may be used to generate the original template for such individuals.

Also, it should be recognized that for this invention we assume a particular biometric data file to be consistent across the database. For example it may contain a set of fingerprints for all individuals in the database, or a set of fingerprint/iriscans for each individual in the database, just so long as a consistent data type is available for each individual in the database so that the invention can operate across all the individual's biometric records in the database to identify the one being sensed at any given time.

After the initial capture of the biometric data, we move to generate a biometric Key to the sample being taken for helping us to sort quickly through the data records in the data base.

There are two phases of key generation. A template key ($x_t$) is generated and stored for each biometric template. A dynamic key ($x_d$), accompanied by a range of error (y) is generated for a captured biometric which will be used to identify a subject. The subset upon which a full comparison will be required is defined as the all templates(t) where:

$$x_d - y <= x_t <= x_d + y.$$

Template Index Generation, phases 12 and 13.

A key is generated for each biometric template when the template is generated at the time of enrollment. Each time a biometric sample is taken or read from a human subject in and enrollment process 11, a template is generated for that measurement or reading. For any biometric requiring on-going training and template generation the key would be generated again each time the template is generated. This becomes the comparison key and should consist of an 8 bit (or larger as storage allows) representation of the template. This representation is in essence a numeric distillation of the most significant attributes of the template from the most significant to the least significant. For example, the most significant digit in the number 840,348,853 is the numeral 8, in the hundred millions' place, and the least significant number is the numeral 3, in the ones' place. A search in an indexed field for the number 840,348,853 should therefore begin with the set representing or covering all numbers present in the database that exist between the numbers 800,000,000 and 9,000,000. Our Bio-Index works on the same principle. When the key is generated in phase 13, a numeric representation of the most significant aspect of the biometric template (from phase 12) becomes the most significant portion of the number that will be the key. In fingerprint data, for example, the type of fingerprint, whorl, curve, etc., may be selected and given corresponding values of 0×001, 0×010, 0×11, and so on. (The notation 0×000 . . . indicates by the presence of the 0× prefix that the number associated therewith is binary). The next most significant attribute could be the height of the curve, whorl, etc. and be represented by preferably 4 bits, or more if desired. After this assemblage of a template, distillation of the key can then proceed. This distillation can get as finely detailed as the template type, biometric, and vendor implementation may allow. The ultimate number, i.e., the template for a particular fingerprint in this example may be:

0×0100 1101 0111 0011 1101 0111 1010 0001

This number can of course be stored in the database as 1299437473, a decimal representation.

Dynamic Index Generation

During the identification process, after the biometric is captured, a key for the captured biometric would be created using the same process, yet providing a range of "error" for each portion of the key. Depending on the collection device, the algorithm used to generate the key templates, and perhaps even the system configuration settings, a certain portion of the least significant places of the key is preferably either dropped or not generated at all. So, dropping the least significant bits of our previous example may generate a captured biometric key of 0×0100 1101 0111 0010 0000 0000 0000 0000 or

1299316736 and a range of error of $1 \times 2^{10}$

Comparison Subset Definition

Using the data from the previous examples, the comparison set given gives us a comparison range of 0×0100 1101 0111 0000 0000 0000 0000 0000 through

0×0100 1101 0111 0100 0000 0000 0000 0000 or 1299185664 through 1299447808.

This simple restriction on the number of digits that needs to be searched reduces the potential population which requires a full comparison by a factor of $2^5$ or one $32^{nd}$. The actual reduction will depend entirely on the key-template generation algorithm's makeup. This makeup or implementation be controlled by the developers of the algorithm so it does not affect the accuracy ratings of the biometrics.

Figure 2:
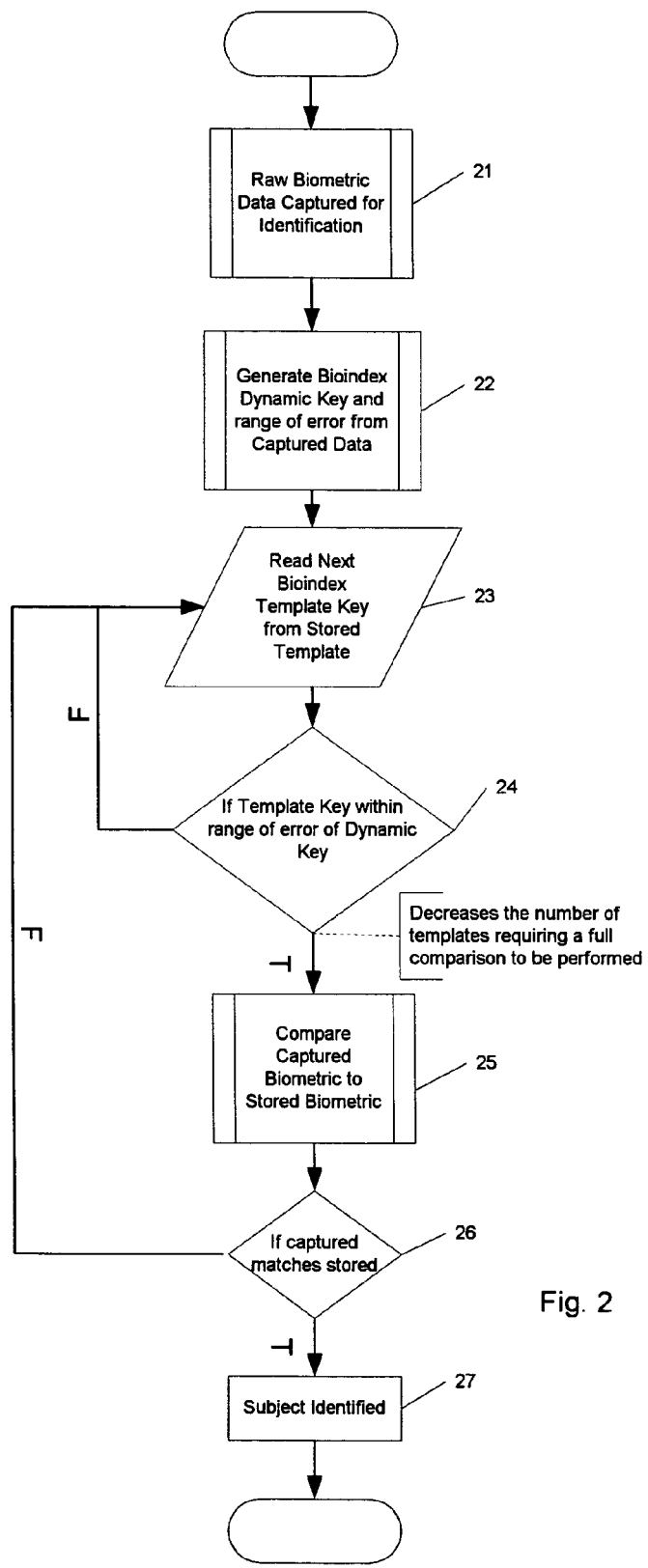

FIG. 2 illustrates the process of using the bioindex. After the reaw biometric data is captured for identification 21, the bioindex key or dynamic key and range of error are calculated or determined 22 from the captured biometric data, in a manner as described above for enrollment. The algorithmic process described for steps 23-26 can be accomplished in any number of ways as will be apparent to one of ordinary skill in these arts. For example, we could have pre-indexed the database and pull only that segment of relevance to the key for examination to insert into step 23. In any event, at step 23, we read the next template key stored in the database, and if it is within the range of error or matching the key generated in step 22, we compare the biometric templated data at this key in the database to the biometric captured and templated in the database in step 25. If the captured biometric matches the stored, step 26, we have identified the subject by noting the ID information associated with the matched data record for an individual in our biometric data database.

Figure 3:
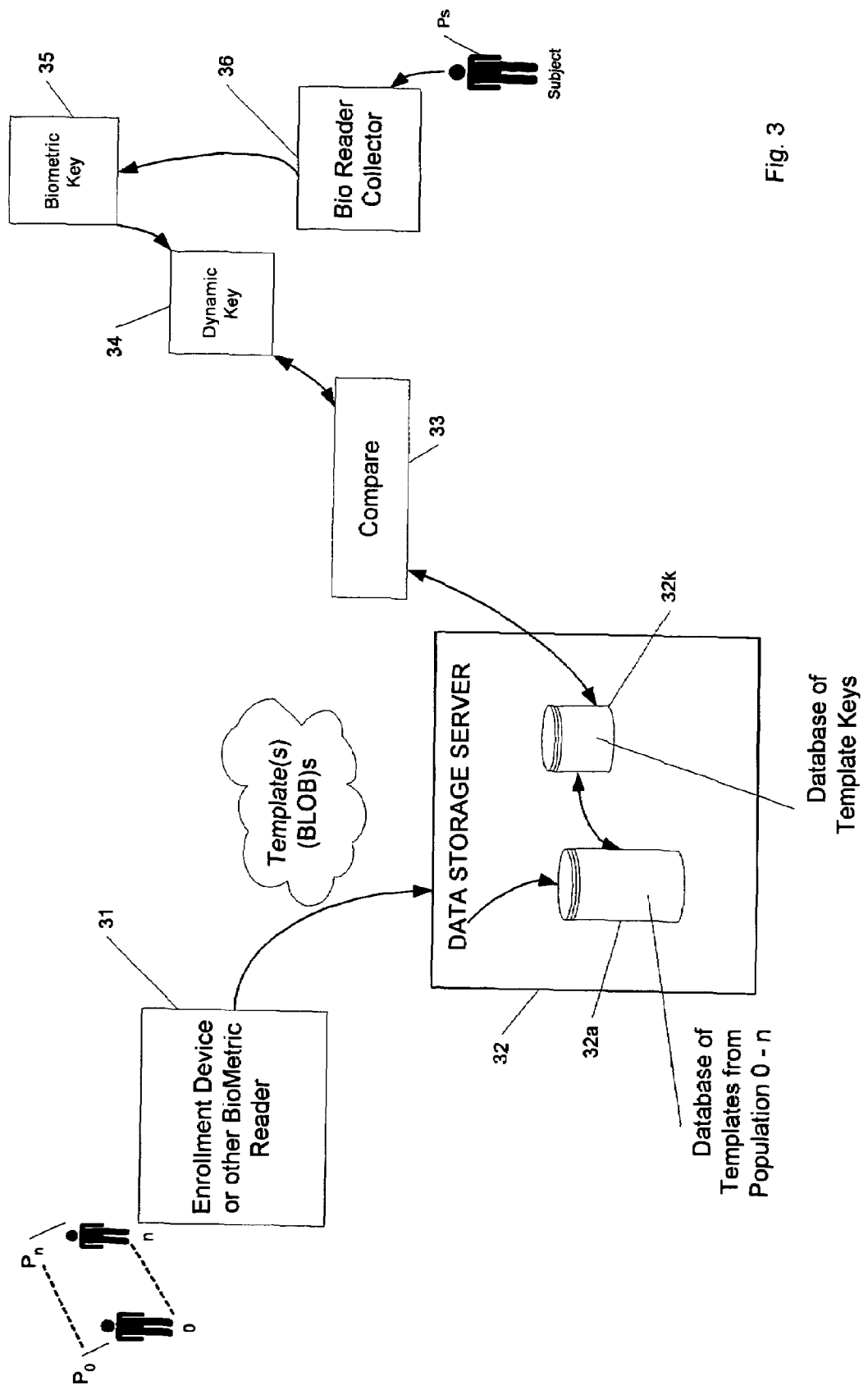
FIG. 3 is a block diagram, illustrating an example environment in which the components of a system implementing some embodiments of the invention operate.

In FIG. 3 we illustrate the general environment of the working of the preferred embodiments of the invention. Any number of individuals P0 . . . Pn may be enrolled at the enrollment facility 31. The templates from this enrollment are transferred, usually as Binary Large Objects or BLOBs to a data storage server 32 which holds the database. Given the shrinking size of memories, it is possible that the data servers and enrollment devices may be combined in the future. In any case, the database 32a will hold the BLOBs form the enrolled population. From each BLOB or template at least one key will be developed and stored in a related database of template keys 32k.

When a subject Ps is checked and biometric data is read from him or her at a biometric reader/collector system 36, a biometric template 35 is extracted therefrom. Preferably a dynamic key 34 is developed from that template, although a regular key could be generated. A process 33 like the process illustrated in FIG. 2 compares this key and eventually the template against the database, using the template keys to shrink the amount of comparisons that need to be done to find a match. Note that a user-id or subject ID should be associated with each template so that the user or subject person can be found when his biometric is matched and other data about the subject can be associated with the results of the search. Since this is why the invention is created generally, it is not seen useful to illustrate a separate data file or field for this name or other related data in the drawing.

We now describe an example method of creating a natural database record key using the ANSI/NIST ITL 1-2000 standard, using the Type-9 minutiae record, using fingerprints.

NIST Special Publication 500-245, "American National Standard for Information Systems—Data Format for the Interchange of Fingerprint, Facial, & Scar Mark & Tattoo (SMT) Information", at page 10, describes Type 9 minutae records as follows: "Type-9 logical records shall contain, and be used to exchange geometric and topological minutiae and related information encoded from a finger or pal. Each record shall represent the processed image data from which the location and orientation descriptors of extracted minutiae characteristics are listed. The primary use of this record type shall be for remote searching of latent prints. Each Type-9 logical record shall contain the minutiae data read from a fingerprint, palm, or latent image".

Figure 4:
FIG. 4 is an image of a fingerprint with minutia points.

The fingerprint is laid out on a grid and the positions of any points of interest, such as where two ridges meet, are noted. The positions and types of these 'minutiae' are noted and stored in a file. See FIG. 4 for an illustration of such a fingerprint. The arrows point out the minutiae.

Figure 5:
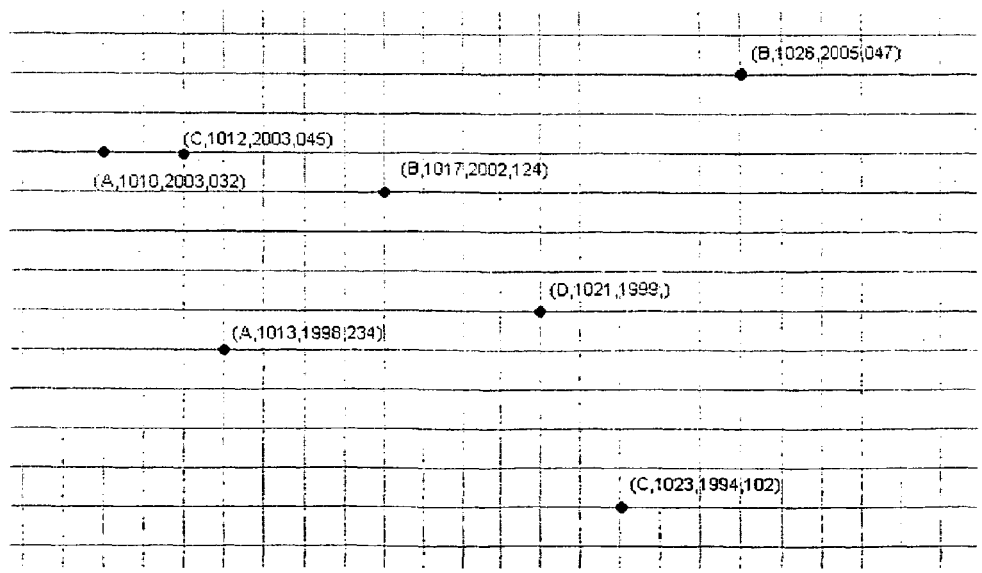
FIGS. 5-7 are grid plotting graphs.

Once the fingerprint data is captured and processed it is a set of points on a grid. One such grid with points is shown in FIG. 5. Note that the data related to each point has an attribute, a pair of grid coordinates (from a 5,000 point grid) and an angle value in the parenthesis near each point. There may be many more such points in a fingerprint.

Thus, the data file describing a fingerprint becomes a collection of points that have type attributes (A,B,C,D), X-Y coordinates, and a theta value (the last number in the value), which indicates the angle of the ridge in degrees. When trying to locate a fingerprint file matching a sample fingerprint, a computer searches these point collections until it finds a record that matches the ones from the sample, i.e., the current search criteria. The problem is that this method of searching, while precise, is very slow. A way to narrow down the search field is needed.

What we do to organize the data is to divide the fingerprint grid into sections and average all the minutiae in that section into one 'composite' minutia data file. Creating a composite helps smooth out any deviations in the data, helping to avoid any false rejections.

Figure 6:
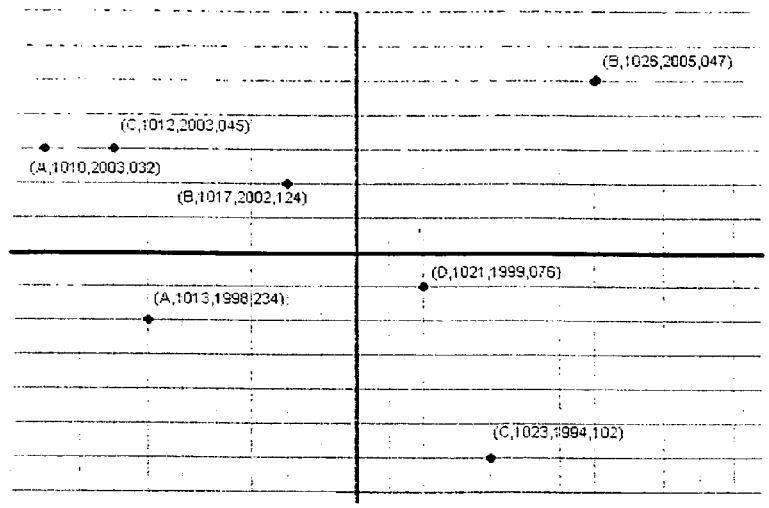

There are several ways to average out the data, but for illustrative purposes we will average each datum separately and then concatenate into one string. We review the FIG. 6 illustration of a grid for this discussion. We average the letters by assigning them values (A=1, B=2, C=3, and D=4). (We average rounding up in this example (i.e., rounding C and D to get D), but any mathematical expedient can be used so long as it is consistent throughout the use of the invention). We will assign quadrants starting at the upper left hand and going clockwise. Averaging the three points in quadrant 1 gives us a composite value of B10132003067. There is only one point in quadrant 2, so the key now becomes B10132003067B10262005047. The final key becomes B10132003067B10262005047D10221997089A10131998234.

Figure 7:
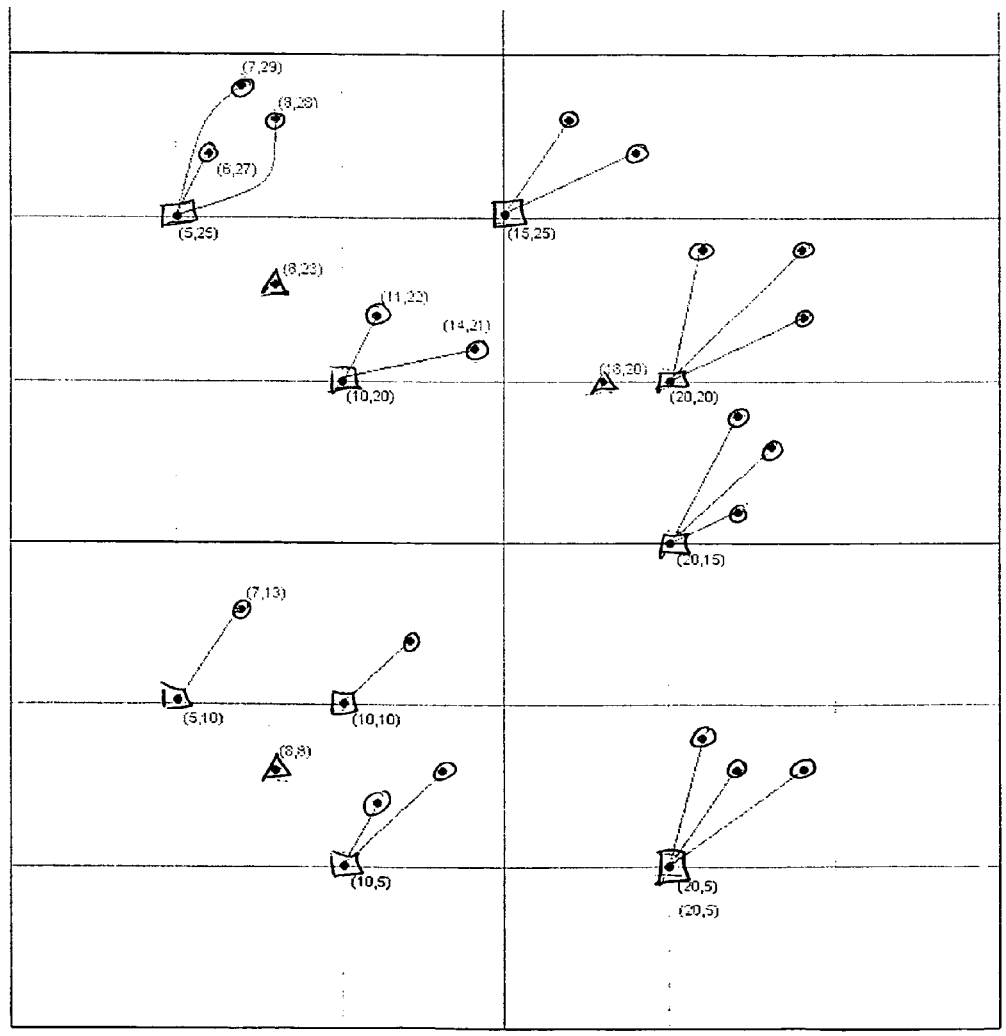

It is also possible to perform the key generation in successive stages. Rather than go directly from the NIST standard 5000×5000 grid to a 2×2 grid, it may be more accurate to go in stages, as illustrated. For the purposes of clarity, only the X and Y values are included, as illustrated in FIG. 7.

The original minutiae points are illustrated in as encircled. These points are pulled down to the nearest 5, that is, it's nearest lower right hand corner of its local five-by-five grid. If more than one point is contained in any 5×5 grid, the points are combined into a single point, illustrated as a point in a square. The local composites are then averaged into the quadrant composites, illustrated as a point in a triangle. These quadrant composites may then be used to generate the key field or fields to be used.

Going through the process in stages will help avoid false rejects because of minor deviations in the minutiae from different images of the same finger.

An alternate strategy to creating a key is to create a key using several fields in the record. Instead of generating one long string, we can take each composite minutia that was generated and bring it out into a separate record field, and then use the several fields as a composite search key.

This process will generate a NON-UNIQUE key. I have avoided calling the generated key a 'primary key' as the term is used in database terminology, because a primary key by definition, is unique. This method will not always generate a unique key, even if we use several fields. What it will do is enable a non-unique index to be created, which will speed up the initial search stage by a factor of thousands.

Once a small group of near matches has been identified, the fingerprint search software can then search the small group for the unique print in the normal fashion.

SUMMARY

We have described a system for quickly finding a match for a large number in a set of large numbers without having to compare each digit of each large number to the one we are trying to match. We have applied this system to biometric data matching describing a system and method to accomplish this. We have described it in detail with respect to a particular biometric, that is, fingerprint data.

The invention claimed is:

1. A method for increasing the rapidity of biometric authentication of a subject against large population samples, comprising:
   enrolling a plurality of subjects by capturing raw biometric data from each subject via at least one biometric data capturing device during an enrollment process;
   generating, for each enrolled subject, an enrollment biometric template from the raw biometric data, the enrollment biometric template comprising a plurality of points of interest;
   storing each enrollment biometric template in association with a subject identification ID, the subject identification ID identifying a particular one of the subjects in the plurality of subjects;
   generating a biometric template key from the biometric template, the biometric template key being generated by splitting the biometric template into a plurality of regions, the template key comprising a concatenation of the averages of the points of interest within each region;
   storing the generated biometric template key in association with the subject identification ID with which the enrollment biometric template is associated;
   generating an authentication template from raw biometric data of an unknown subject captured during an authentication process, the authentication template comprising a plurality of points of interest;
   generating an authentication key from the authentication template, the authentication key being generated by splitting the authentication template into a plurality of regions, the authentication key comprising a concatenation of the averages of the points of interest within each region;
   searching the stored biometric template keys to identify a set of biometric template keys matching the authentication key;
   retrieving the enrollment biometric templates associated with each biometric template key in the set of identified biometric keys matching the authentication key; and,
   comparing the authentication template against the retrieved enrollment biometric templates and authenticating the unknown subject if the authentication template matches one of the retrieved enrollment biometric templates.

2. The method of claim 1, the authentication template being a dynamic template, and the authentication key being a dynamic key.

3. The method of claim 1, the plurality of regions into which the biometric template and the authentication template are divided comprising quadrants.

4. The method of claim 1, the raw biometric data comprising fingerprint data.

5. The method of claim 1, the plurality of regions comprising a grid.

6. The method of claim 5, wherein said grid uses the ANSI/NIST ITL 1-2000 standard.

7. The method of claim 5, the terminal generation processes further comprising organizing the respective grids of data points in a set manner to produce uniform data files for each biometric capture process.

8. The method of claim 1, searching the stored biometric template keys to identify a set of biometric template keys matching the authentication key comprising matching significant bits of the biometric template keys with significant bits of the authentication key.

9. The method of claim 8, wherein the bits matched start from most significant bit and continue in sequence to the least significant bit.

10. The method of claim 9, wherein the number of bits matched corresponds to a pre-determined error level.

11. The method of claim 10, wherein the pre-determined error level is used to return a range of biometric template keys to compensate for biometric collection error.

12. A method for quickly determining a match between an unknown subject biometric and a database of enrolled subject biometric files, each biometric file stored in the database having associated therewith a biometric template generated from each biometric file, a biometric key associated with and derived from the biometric template, and a subject ID field, the biometric key being generated by splitting the biometric template into a plurality of regions, the biometric key comprising a concatenation of the averages of the points of interest within each region, the method comprising:

generating an authentication template from biometric data of an unknown subject captured during an authentication process;

generating an authentication key from the authentication template, the authentication key being generated by splitting the authentication template into a plurality of regions, the authentication key comprising a concatenation of the averages of the points of interest within each region;

identifying a set of matching biometric templates by comparing the authentication key against the biometric keys stored in the database;

retrieving biometric templates associated with the biometric keys in the set of matching biometric templates;

comparing the authentication template to the retrieved biometric templates; and, if the authentication template matches a retrieved biometric template, authenticating the unknown subject as the subject ID associated with the biometric template.

13. The method of claim 12 wherein said authentication template is dynamic, and wherein said authentication key is dynamic.

14. The method of claim 12, wherein the captured biometric data comprises a plurality of points of interest.

15. The method of claim 12 wherein the authentication and enrollment processes employ fingerprint data as raw biometric data.

16. The method of claim 12, the regions being organized to form a grid.

17. The method of claim 16, wherein said grid uses the ANSI/NIST ITL 1-2000 standard.

18. The method of claim 16 wherein said template generation process organizes said grid of data points in a set manner to produce uniform data files for each biometric capture process.

19. The method of claim 12, the plurality of regions into which the biometric template and the authentication template are divided comprising quadrants.

20. The method of claim 12, searching the stored biometric template keys to identify a set of biometric template keys matching the authentication key comprising matching significant bits of the biometric template keys with significant bits of the authentication key.

21. The method of claim 20, wherein the bits matched start from most significant bit and continue in sequence to the least significant bit.

22. The method of claim 21, wherein the number of bits matched corresponds to a pre-determined error level.

23. The method of claim 22, the pre-determined error level being used to return a range of biometric template keys to compensate for biometric collection error.

24. An apparatus for quickly determining a match between an unknown subject's biometric and a set of subject biometric files in a database of enrolled subject biometric files comprising:

a database of enrolled subject biometric files, each biometric file stored in the database having associated therewith a biometric template generated from each biometric data file, a biometric key associated with and derived from the biometric template, and a subject ID field the biometric key being generated by splitting the biometric template into a plurality of regions, the biometric key comprising a concatenation of the averages of the points of interest within each region;

a biometric sensing device for capturing biometric data from the unknown subject;

computing means for generating an authentication template data record based on the captured biometric data, the authentication template data record comprising a plurality of points of interest within the biometric data;

computing means for determining an authentication key from said template data record, the authentication key being generated by splitting the template data record into a plurality of regions, the authentication key comprising a concatenation of the averages of the points of interest within each region;

computing means for finding those biometric keys stored in the database which are within a range of values around the authentication key; and comparison means for comparing the authentication template against the biometric templates associated with the found biometric keys.

* * * * *